(12) United States Patent
Yoshida

(10) Patent No.: US 6,501,568 B1
(45) Date of Patent: Dec. 31, 2002

(54) DATA COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,022

(22) Filed: Nov. 5, 1999

(30) Foreign Application Priority Data

Nov. 6, 1998 (JP) .......................................... 10-315658

(51) Int. Cl.[7] .......................... H04N 1/00; H04M 11/00
(52) U.S. Cl. ................... 358/407; 358/405; 379/100.09
(58) Field of Search ............................... 358/405, 407, 358/442, 440; 379/100.09

(56) References Cited

U.S. PATENT DOCUMENTS

| | | | | |
|---|---|---|---|---|
| 5,521,719 A | * | 5/1996 | Yamada ....................... | 358/435 |
| 5,671,270 A | | 9/1997 | Yoshida ....................... | 358/468 |
| 6,097,797 A | * | 8/2000 | Oseto ......................... | 358/402 |

* cited by examiner

Primary Examiner—Kimberly A. Williams
(74) Attorney, Agent, or Firm—Fitzpatrick, Cella, Harper & Scinto

(57) ABSTRACT

A data communication apparatus has the capability of properly requesting another data communication apparatus to transmit a notification message as to the result of relay broadcasting and has the capability of properly receiving the notification message thereby preventing an unacceptable request from being sent and a useless notification message from being returned. When a request for relay broadcasting is issued via a sub-address signal, a selection is made as to whether or not to request transmission of a notification message as to the result of relay broadcasting. Depending on the selection made above, a request is issued for transmission of a notification message as to the result of relay broadcasting as well as a request for relay broadcasting. When the data communication apparatus receives a message representing whether or not a relaying apparatus to which the request for relay broadcasting has been issued has the capability of transmitting a notification message as to the result of relay broadcasting, the data communication apparatus requests, in accordance with the notification message received from the relaying apparatus, the relaying apparatus to return a notification message as to the result of relay broadcasting. When the selection is made so as to request transmission of a notification message as to the result of relay broadcasting, if the relaying apparatus does not have the capability of transmitting a notification message as to the result of relay broadcasting, a message is displayed to notify a user that a notification message as to the result of relay broadcasting will not be received.

5 Claims, 7 Drawing Sheets

DATA COMMUNICATION APPARATUS

BACKGROUND OF THE INVENTION

1. Field of the Invention

The present invention relates to a data communication apparatus, and more particularly to a data communication apparatus such as a facsimile device capable of transmitting a sub-address signal according to the ITU-T recommendation.

2. Description of the Related Art

In conventional facsimile devices capable of transmitting a sub-address signal, it is possible to issue a sub-address signal to request a receiving facsimile device to perform relay broadcasting. However, there is no standard or recommendation as to relay broadcasting result notification returned from a facsimile device that performs relay broadcasting in response to a request to a facsimile device that issued the request.

A problem arising from the absence of the standard is that when a facsimile device that has requested relay broadcasting wants to receive notification of the result of relay broadcasting, a facsimile device that has performed relay broadcasting in response to the request sometimes sends no notification of the result of the relay broadcasting. In some cases, when a facsimile device that has requested relay broadcasting does not need notification of the result of relay broadcasting, a facsimile device that has performed relay broadcasting in response to the request sometimes sends notification the result of relay broadcasting.

SUMMARY OF THE INVENTION

In view of the above, it is an object of the present invention to provide a data communication apparatus capable of requesting and receiving notification of the result of relay broadcasting to or from another data communication apparatus in an adequate manner that prevents an unacceptable request from being sent and a useless notification message from being returned.

DESCRIPTION OF THE PREFERRED EMBODIMENT

As an example of a data communication apparatus, a facsimile device is described below.

Figure 1:
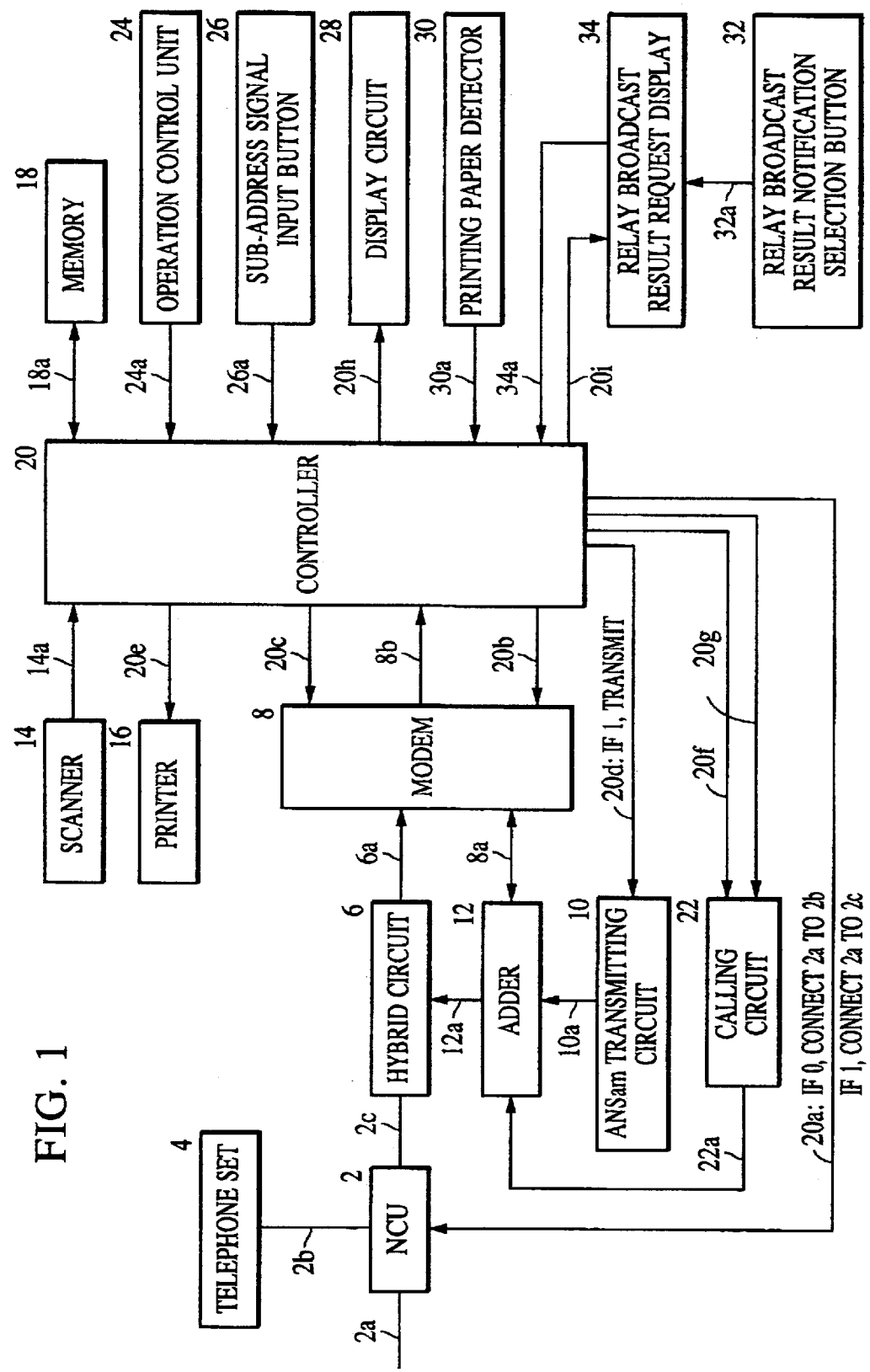
FIG. 1 is a block diagram illustrating an embodiment of the present invention.

FIG. 1 is a block diagram illustrating the construction of an embodiment of a facsimile device according to the present invention.

An NCU (network control unit) 2 is connected to an end of a line so as to perform data communication via a telephone network. The NCU 2 is responsible for control of a connection via a telephone exchange network, switching to a data communication line, holding a loop, etc. If the NCU 2 receives a "0"-level signal from a controller 20 (via a signal line 20a), the NCU 2 connects a telephone line 2a to a telephone set 4. On the other hand, if the NCU 2 receives a "1"-level signal from the controller 20, then the NCU 2 connects the telephone line 2a to a facsimile device. In a normal state, the telephone line 2a is connected to the telephone set 4.

A hybrid circuit 6 isolates a transmission signal from a reception signal. A transmission signal supplied by an adder 12 is transferred to the signal line 2a via the NCU 2. On the other hand, an incoming signal received via the NCU 2 is transferred to a modem 8 via a signal Line 6a.

The modem 8 serves to perform modulation and demodulation in accordance with the ITU-T recommendation V. 9, V.21. V-27ter, V.29, V.17, or V.34 specified via a signal line 20c. The modem 8 receives a signal via a signal line 20b and outputs modulated data over a signal line 8a. The modem 8 also receives a reception signal via a signal line 6a and outputs demodulated data over a signal line 8b.

An ANSam transmission circuit 10 serves to transmit an ANSam signal. When a signal line 20d is at a "1" level, the ANSam transmission circuit 10 transmits an ANSam signal over a signal line 10a. If the signal line 20d is at a "0" level, the ANSam transmission circuit does not output any signal to the signal line 10a.

The adder 12 receives signals via the signal lines 8a, 10a, and 22a and outputs the sum of these signals to a line 12a. A scanner 14 scans a document and outputs image data of the document to a signal line 14a. A printer 16 receives information via a signal line 20e and prints the received information line by line.

A memory 18 is used to store raw data obtained via the scanner or encoded information. The memory 18 is also used to store received information or decoded information.

In response to a call command pulse on a signal line 20f, a calling circuit 22 inputs telephone-number information via a signal line 20g and outputs a DTMF selection signal to the signal line 22a.

An operation control unit 24 includes a one-touch dialing key, an abbreviated dialing key, a ten-key pad, a "*"-key, a "#"-key, a setting key, a start key, and other function keys. If some key is pressed, corresponding information is output via a signal line 24a.

A sub-address input button 26 is used to input a sub-address. If this button 26 is pressed, a pressing pulse is generated on a signal line 26a.

A display 28 displays information received via a signal line 20h.

A printing paper detector 30 detects whether there is printing paper on the printer 16. When there is printing paper, the printing paper detector 30a outputs a "1"-level signal over a signal line 30a, while the printing paper detector 30a outputs a "0"-level signal over the signal line 30a when there is no printing paper.

A relay broadcast result notification selection button 32 is a button (selection means) used to select whether or not to request notification of the result of relay broadcasting. If this button 32 is pressed, a pressing pulse is generated over a signal line 32a.

A relay broadcast result request display 34 is a display for displaying information indicating, in accordance with the operation of the relay broadcast result notification selection button 32 whether a request for transmission of a notification message as to the result of relay broadcasting is issued. If a clear pulse is generated on a signal line 20i, no information is displayed on the display 34. The content of information displayed on the display 34 is changed alternately between "Request" and "Don't Request", each time a pressing pulse is generated on the signal line 32a. When "Request" is displayed on the display 34, a "1"-level signal is output over a signal line 34a. When "Don't Request" is displayed on the display 34, a "0"-level signal is output over the signal line 34a.

A controller 20 is responsible for controlling the entire facsimile device having the capability of transmitting a. sub-address signal according to the ITU-T recommendation. In particular, in the present embodiment, when a request for relay broadcasting is issued via a sub-address signal, a series of controlling operations is performed to issue a request for transmission of a notification message as to the result of relay broadcasting, in accordance with the selection made via the relay broadcast result notification selection button 32.

Furthermore, in the present embodiment, when a relaying facsimile device receives a request for relay broadcasting, the relaying facsimile device sends a message indicating whether it has the capability of transmitting a notification message as to the result of relay broadcasting to a sending facsimile device which has issued the request for the relay broadcasting. Depending on the message, the sending facsimile device issues a request for transmission of a notification message as to the result of relay broadcasting.

When a sending facsimile device has made a selection so as to request transmission of a notification message as to the result of relay broadcasting, if a relaying facsimile device does not have the capability of transmitting a notification message as to the result of relay broadcasting, the sending facsimile device displays on the display 28 a message stating that a notification message as to the result of relay broadcasting may not be received.

When a sending facsimile device has no printing paper on its printer and has no enough memory space to store a received notification message as to the result of relay broadcasting, the sending facsimile device does not request transmission of a notification message as to the result of relay broadcasting even if a user selects to request transmission of the notification message. In this case, the sending facsimile device displays on its display 28 a message stating that the request for transmission of the notification message as to the result of relay broadcasting has been cancelled because of a lack of printing paper and because of an insufficient memory space for storing the received notification message.

Referring to flow charts shown in FIGS. 2 to 7, the operation of the controller 20 according to the present embodiment is described below.

Figure 2:
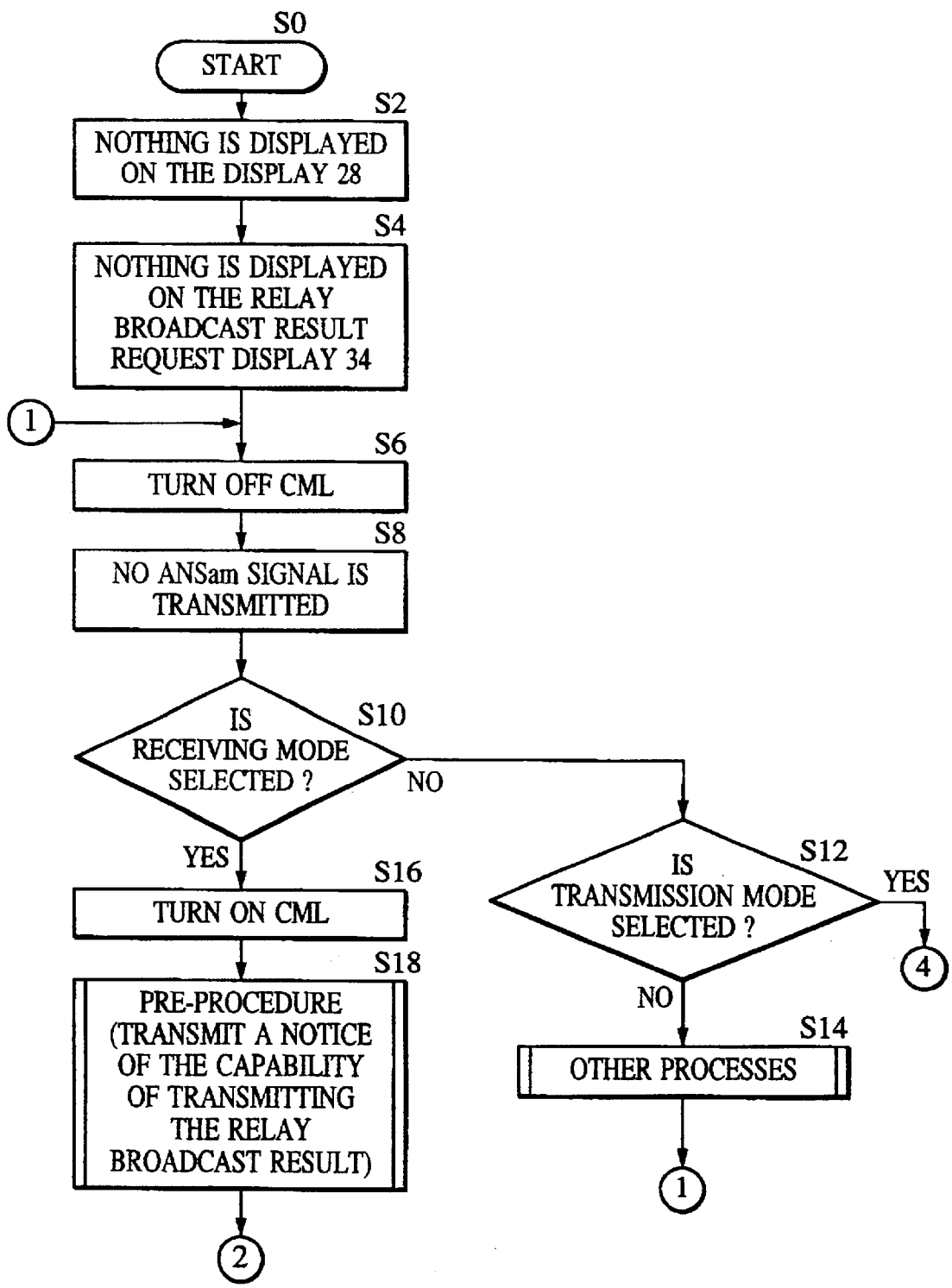
FIG. 2 is a flow chart illustrating the operation of the embodiment shown in FIG. 1.
Figure 3:
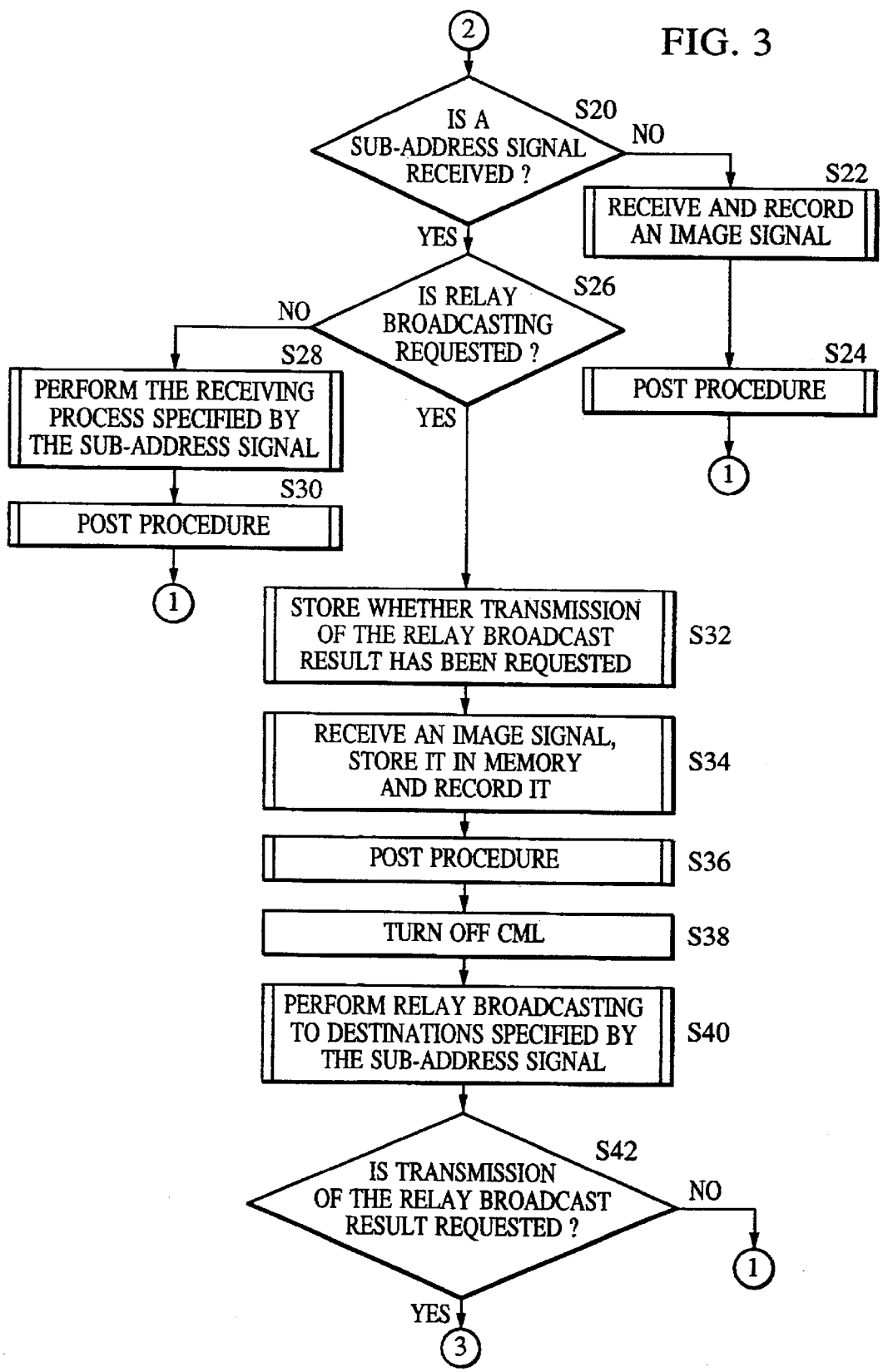
FIG. 3 is a flow chart illustrating the operation of the embodiment shown in FIG. 1.
Figure 4:
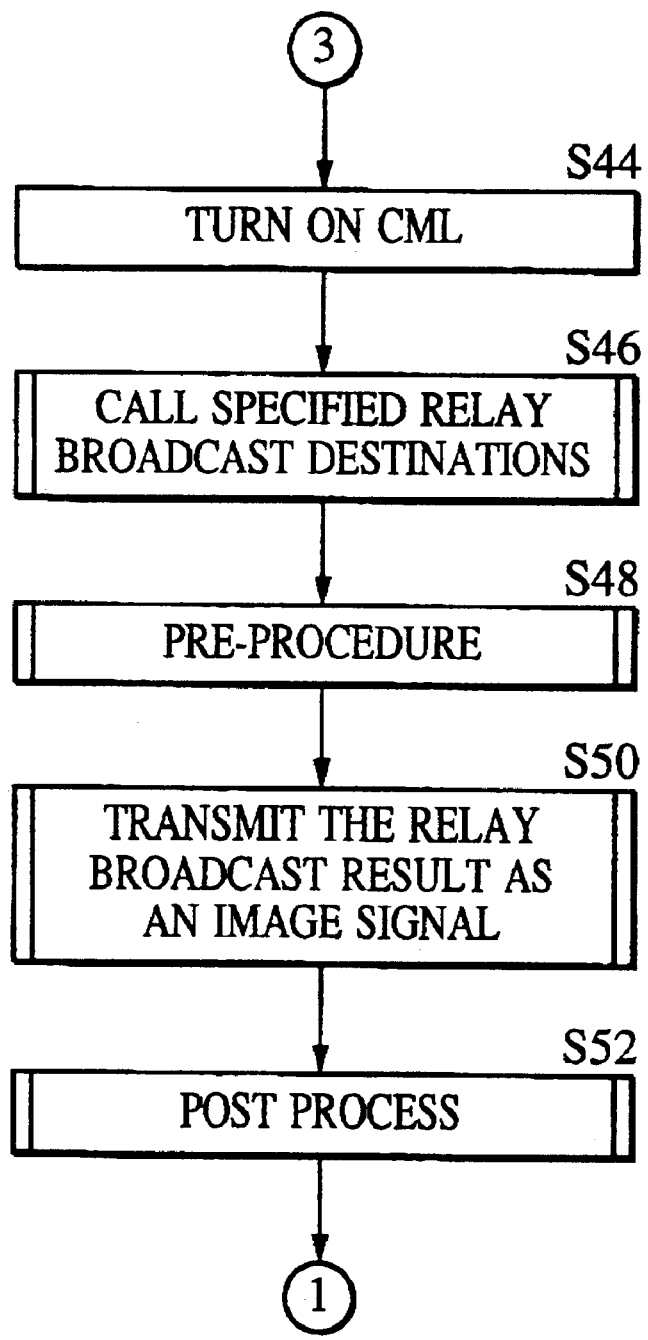
FIG. 4 is a flow chart illustrating the operation of the embodiment shown in FIG. 1.
Figure 5:
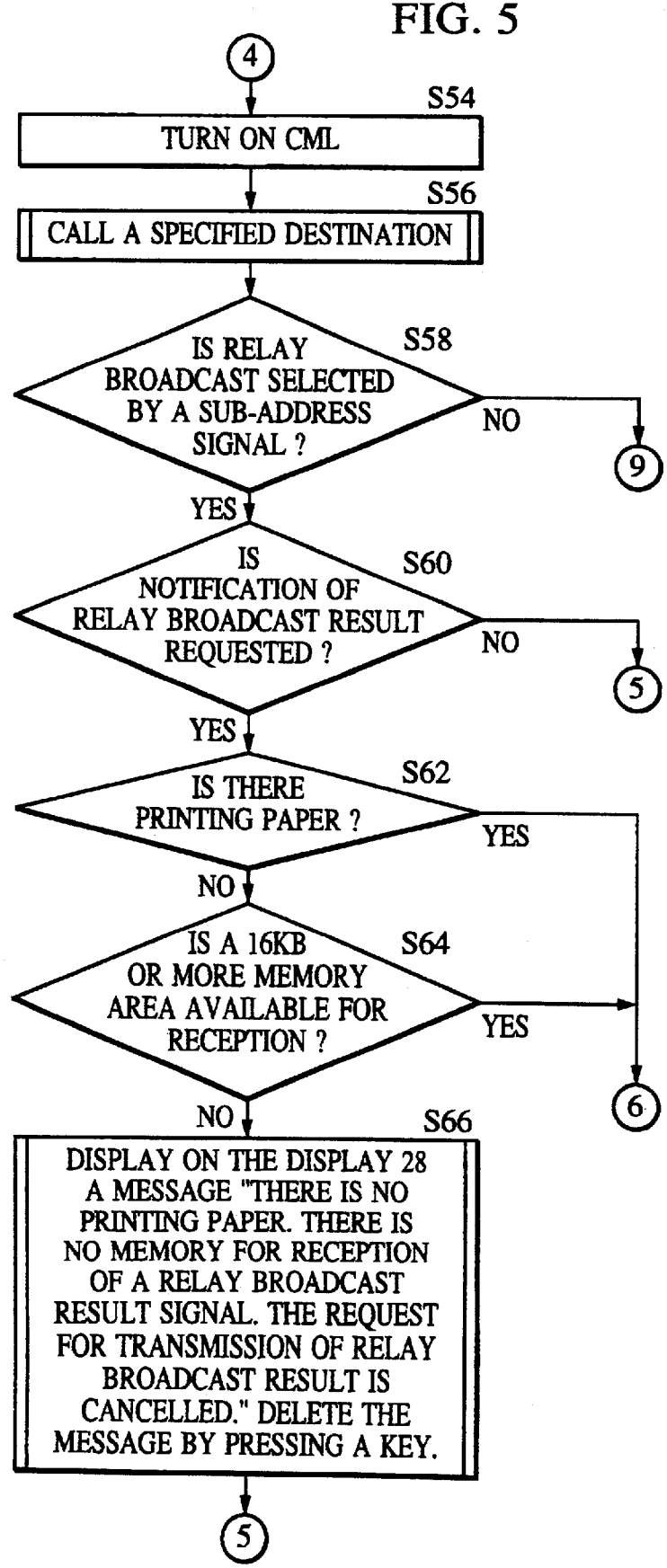
FIG. 5 is a flow chart illustrating the operation of the embodiment shown in FIG. 1.
Figure 6:
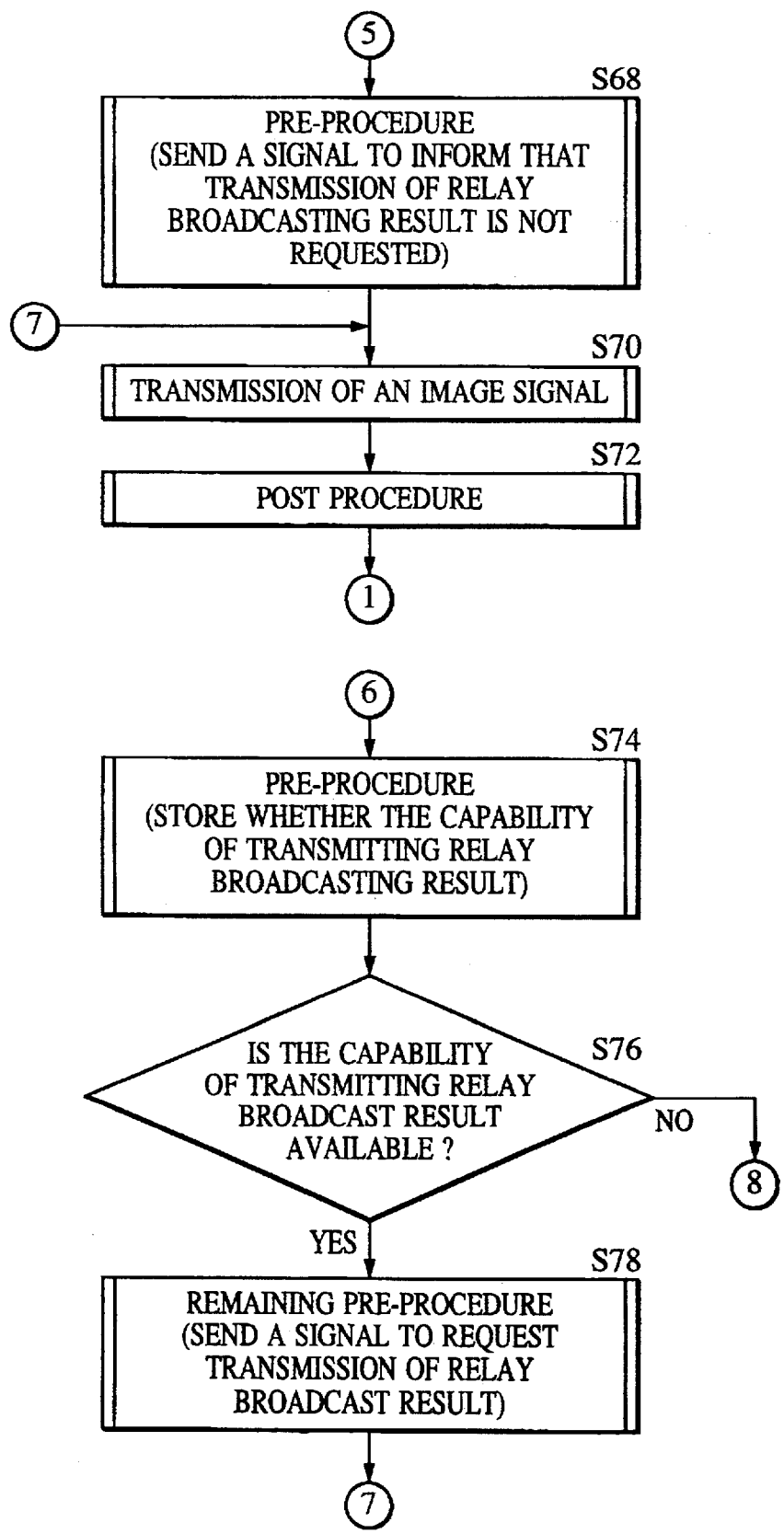
FIG. 6 is a flow chart illustrating the operation of the embodiment shown in FIG. 1.
Figure 7:
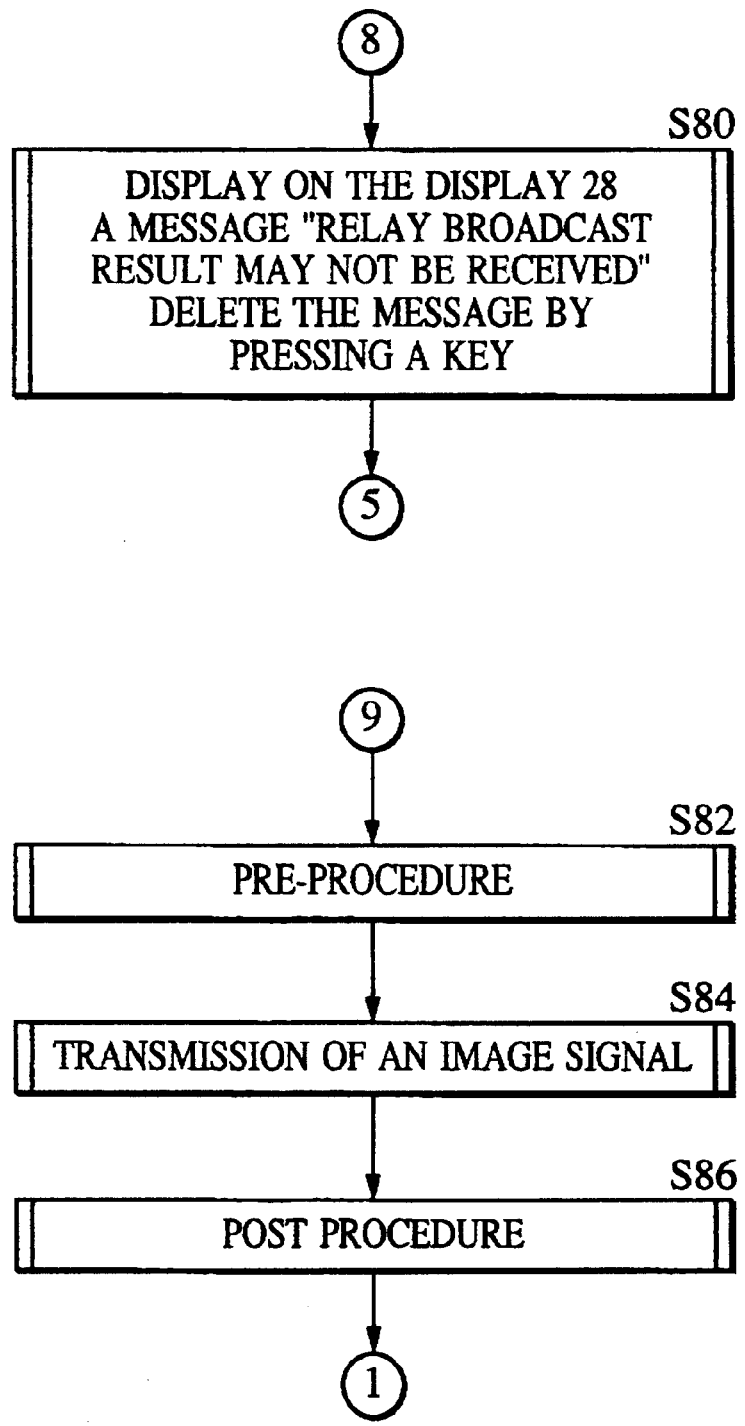
FIG. 7 is a flow chart illustrating the operation of the embodiment shown in FIG. 1.

In FIG. 2, the operation is started in step S0. In step S2, no signal is output to the signal line 20h and thus nothing is displayed on the display 28 In step S4, a clear pulse is generated over the signal line 20i such that nothing is displayed on the relay broadcast result request display 34.

In step S6, a "0"-level signal is output over the signal line 20a so as to turn off CML. In step S8, a "0"-level signal is output over the signal line 20d so that no ANSam signal is transmitted.

In step S10, it is determined whether a receiving mode is selected. If it is determined in step S10 that the receiving mode is selected, then the process goes to step S16. However, the process goes to step S12, if the receiving mode is not selected. In step S12, it is determined whether a transmission mode is selected. If it is determined in step S12 that the transmission mode is selected, then the process goes to step S54. If the transmission mode is not selected, the process goes to step S14 to perform other processes.

In step S16, a "1"-level signal is output over the signal line 20a thereby turning on CML. Then in step S18, a pre-procedure is performed to transmit a notification message stating that the device has the capability of transmitting a notification message as to the result of relay broadcasting.

In step S20, it is determined whether a sub-address signal has been received. If a sub-address signal has been received, the process goes to step S26. However, the process goes to step S22 if no sub-address signal has been received.

In step S22, an image signal is received and printed (if there is no printing paper, the received signal is stored in a memory). In step S24, a post procedure is performed. After completion of the post procedure, the process goes to step S6.

In step S26, it is determined whether relay broadcasting is requested via the sub-address signal. If relay broadcasting is requested, the process goes to step S32. The process is goes to step S28 if relay broadcasting is not requested.

In step 28, reception specified by the sub-address signal is performed. A post procedure is then performed in step S30, and the process goes to step S6.

In step S32, if a transmission of a notification message as to the result of relay broadcasting is requested by a sending facsimile device, information indicating that transmission of a notification message is requested is stored during the pre-procedure. In step S34, an image signal is received and printed or stored in the memory. Then in steps S36, a post procedure is performed.

In step S38, a "0"-level signal is output over the signal line 20a thereby turning off CML. In step S40, relay broadcasting is performed to destinations specified by the sub-address signal.

In step S42, it is determined whether or not transmission of a notification message as to the result of relay broadcasting is requested. If it is requested, then the process goes to step S44, however the process goes to step S6 if it is not requested.

In step S44, a "1"-level signal is output over the signal line 20a so as to turn on CML. In step S46, a relay broadcasting call is made via a calling circuit 22 to specified destinations. In step S48, a pre-procedure is performed. Then in step S50, a notification message as to the result of the relay broadcasting is transmitted in the form of an image signal. In step S52, a post procedure is performed, and the process goes to step S6.

In step S54, a "1"-level signal is output over the signal line 20a so as to turn on CML. Then in step S56, a call is made to a specified destination via the calling circuit 22.

In step S58, information is input via the signal lines 24a and 26a, and it is determined whether or not relay broadcasting is requested by the sub-address signal. If it is requested, then the process goes to step S60, however the process goes to step S82 if it is not requested.

In step S60, information is input via the signal line 34a, and it is determined whether or not a request for transmission of a notification message as to the result of relay broadcasting is selected. If it is selected, then the process goes to step S62, however the process goes to step S68 if it is not selected.

In step S62, information is input via the signal line 30a, and it is determined whether or not there is printing paper. If there is printing paper, the process goes to step S74, however the process goes to step S64 if there is no printing paper. In step S64, it is determined whether or not a 16 KB or more memory area is available for reception. If the memory is available, the process goes to step S74, however the process goes to step S66 if an enough memory area is not available.

In step S66, a message "Request for transmission of a notification message as to the result of relay broadcasting is cancelled because of a lack of printing paper and an insufficient memory space for storing a received notification message" is displayed on the display 28 via the signal line 20h. The message is deleted by pressing a key.

In step S68, a pre-procedure is performed. In this pre-procedure, a message is transmitted which states that transmission of a notification message as to the result of relay broadcasting is not requested. Then an image signal is transmitted in step S70, and a post procedure is performed in step S72.

In step S74, a pre-procedure is performed to store information as to the capability of transmitting a notification message as to the result of relay broadcasting. In step S76, it is determined whether or not the capability of the transmitting a notification message as to the result of relay broadcasting is available. If yes, then the process goes to step S78. However, if no, the process goes to step S80.

In step S78, the remaining part of the pre-procedure is performed. Herein, a message is transmitted to request transmission of a notification message of the result of relay broadcasting. In step S80, a message stating "Notification message as to the result of relay broadcasting may not be received" is displayed on the display 28 via the signal line 20h. The message is deleted by pressing a key. After that, the process goes to step S68.

A pre-procedure is performed in step S82, and an image signal is transmitted in step S84. A post procedure is then performed in step S86, and the process goes to step S6.

In the above description, the operation is performed by a CPU provided in the controller in accordance with a program stored in ROM or RAM provided in the controller. Alternatively, the program may be stored on an external storage medium such as a floppy disk, a hard disk, an optical disk, a CD-ROM, or a memory card, and the program may be loaded via a dedicated reading device and may be executed by the CPU of the controller.

Furthermore, although in the embodiment described above, the facsimile device is of the stand-alone type, the invention may also be employed to control data communication in a wide variety of data processing devices, such as a data processing device having integrated capabilities including a communication capability combined with other capabilities such as copying or electronic filing.

According to the present invention, as described above, when a user of a sending data communication apparatus issues a request for relay broadcasting, the user may select whether or not to request a relaying data communication apparatus, that will perform the relay broadcasting, to return a notification message as to the result of the relay broadcasting. This allows a notification message as to the result of relay broadcasting to be transmitted in an adequate manner between a sending communication apparatus that requests relay broadcasting and a relaying communication apparatus that receives the request.

Furthermore, according to the present invention, it is possible to request transmission of a notification message as to the result of relay broadcasting using a proper protocol thereby preventing an unacceptable request from being issued. Furthermore, according to the present invention, when transmission of a notification message as to the result of relay broadcasting, if a receiving apparatus does not have the capability of transmitting a notification message, it is possible to display a message stating that a notification message will not be returned. This is very convenient for users.

Furthermore, according to the present invention, when a request for relay broadcasting is issued, if there is neither printing paper nor enough memory space for storing a received signal, a user may decide not to request transmission of a notification message as to the result of relay broadcasting because it is impossible to receive the notification message. This makes it possible to prevent a useless notification message as to he result of relay broadcasting from being transmitted. In this case, a message stating that there is neither printing paper nor enough memory space for storing a received signal may be displayed. This is convenient for users.

What is claimed is:

1. A data communication apparatus having the capability of transmitting a sub-address signal according to the ITU-T recommendation, said data communication apparatus comprising:

selection means for selecting whether or not to request transmission of a notification message as to the result of relay broadcasting when requesting the relay broadcasting via said sub-address signal; and notification means for transmitting a message to request said relay broadcasting and transmission of a notification message as to the result of said relay broadcasting, depending on the selection performed via said selection means.

2. A data communication apparatus according to claim 1, wherein said data communication apparatus has the capability of receiving a notification message representing whether or not a relaying apparatus to which a request for relay broadcasting has been issued has the capability of transmitting a notification message as to the result of relay broadcasting, and said data communication apparatus requests, in accordance with said notification message from said relaying apparatus, said relaying apparatus to return a notification message as to the result of relay broadcasting.

3. A data communication apparatus according to claim 1, further comprising display means for displaying a message in such a manner that when said selection means selects a request for transmission of a notification message as to the result of relay broadcasting, if the relaying apparatus does not have the capability of transmitting a notification message as to the result of relay broadcasting, said display means displays a message stating that a notification message as to the result of relay broadcasting will not be received.

4. A data communication apparatus according to claim 1, wherein when there is no printing paper for outputting a received notification message as to the result of relay broadcasting and when there is no enough memory space to store the received notification message as to the result of relay broadcasting, said data communication apparatus does not request transmission of a notification message as to the result of relay broadcasting even if said selection means selects to request transmission of a notification message.

5. A data communication apparatus according to claim 1, further comprising display means for displaying, a message stating that a request for transmission of a notification message as to the result of relay broadcasting is not issued, when the request is not issued.

* * * * *

UNITED STATES PATENT AND TRADEMARK OFFICE
CERTIFICATE OF CORRECTION

PATENT NO. : 6,501,568 B1
DATED : December 31, 2002
INVENTOR(S) : Takehiro Yoshida It is certified that error appears in the above-identified patent and that said Letters Patent is hereby corrected as shown below:

Column 2,
Line 13, "Line" should read -- line --.
Line 15, "V. 9," should read -- V. 8, --.

Column 3,
Line 8, "a." should read -- a --.
Line 33, "on" should read -- in --.
Line 34, "has no" should read -- does not have --.
Line 50, "display 28" should read -- display 28. --

Column 4,
Line 15, "is" should be deleted.
Line 24, "steps" should read -- step --.
Line 63, "an enough" should read -- a sufficient --.

Column 6,
Line 8, "he" should read -- the --.
Line 50, "no" should read -- not --.

Signed and Sealed this

Eighth Day of July, 2003

JAMES E. ROGAN
*Director of the United States Patent and Trademark Office*